US009183227B2

(12) United States Patent
Clinchant et al.

(10) Patent No.: US 9,183,227 B2
(45) Date of Patent: Nov. 10, 2015

(54) CROSS-MEDIA SIMILARITY MEASURES THROUGH TRANS-MEDIA PSEUDO-RELEVANCE FEEDBACK AND DOCUMENT RERANKING

(75) Inventors: Stephane Clinchant, Meylan (FR); Jean-Michel Renders, Quaix-en-Chartreuse (FR)

(73) Assignee: XEROX CORPORATION, Norwalk, CT (US)

( * ) Notice: Subject to any disclaimer, the term of this patent is extended or adjusted under 35 U.S.C. 154(b) by 1961 days.

(21) Appl. No.: 12/233,978

(22) Filed: Sep. 19, 2008

(65) Prior Publication Data

US 2010/0082615 A1   Apr. 1, 2010

(51) Int. Cl.
*G06F 17/30*   (2006.01)

(52) U.S. Cl.
CPC .... *G06F 17/30256* (2013.01); *G06F 17/30265* (2013.01)

(58) Field of Classification Search
CPC .................. G06F 17/30256; G06F 17/30265
See application file for complete search history.

(56) References Cited

U.S. PATENT DOCUMENTS

| | | | | |
|---|---|---|---|---|
| 6,728,752 | B1 * | 4/2004 | Chen et al. | 709/203 |
| 7,814,040 | B1 * | 10/2010 | Zhang et al. | 706/45 |
| 7,840,076 | B2 * | 11/2010 | Bouguet et al. | 382/224 |
| 2005/0086253 | A1 * | 4/2005 | Brueckner | 707/102 |
| 2006/0041604 | A1 * | 2/2006 | Peh | 707/205 |
| 2008/0118151 | A1 * | 5/2008 | Bouguet et al. | 382/181 |
| 2008/0212899 | A1 * | 9/2008 | Gokturk et al. | 382/305 |

OTHER PUBLICATIONS

Carbonetto et al., "A Statistical Model for General Contextual Object Recognition," in ECCV, 2004.
Csurka et al., "Visual Categorization with Bags of Keypoints," In ECCV Workshop on Statistical Learning for Computer Vision, 2004.
Farquhar et al., "Improving "bag-of-keypoints" image categorisation: Generative Models and PDF-Kernels," Technical Report, University of Southampton, 2005.
Feng et al., "Multiple Bernoulli Relevance Models for image and Video Annotation," In CVPR, 2004.
Jaakkola et al., "Exploiting generative models in discrminatve cassfers," In Advances in Neural Informtion Processing Systems 11, 1999.
Lowe et al., "Distinctive Image Features from Scale-Invariant Keypoints," IJCV, 60(2), 2004.
Maillot et al., "IPAL Inter-Media Pseudo-Relevance Feedback Approach to Image CLEF 2006 Photo Retrieval," In CLEF 2006 Working Notes, 2006.
Perronnin et al., "Adapted Vocabularies for Generic Visual Categorization," In CVPR, 2007.

(Continued)

*Primary Examiner* — Daniel Kinsaul
(74) *Attorney, Agent, or Firm* — Fay Sharpe LLP (57) ABSTRACT

A multimedia information retrieval system includes a storage and an electronic processing device. The latter is configured to perform a process including: computing values of a pairwise similarity measure quantifying pairwise similarity of documents of a multimedia reference repository; storing the computed values in the storage; performing an initial information retrieval process respective to the multimedia reference repository to return a set of initial repository documents; and identifying a set of top ranked documents of the multimedia reference repository based at least on the stored computed values pertaining to the set of initial repository documents.

18 Claims, 3 Drawing Sheets

(56) References Cited

OTHER PUBLICATIONS

Perronnin et al., "Adapted Vocabularies for Generic Visual Categorization," in ECCV, 2006.
Sivic et al., "Video Google: A Text Retrieval Approach to Object Matching in Videos," In ICCV, vol. 2, 2003.
Blei et al., "Modeling Annotated Data," In ACM SIGIR, 2003.
Chang et al., "Approaches of Using a Word-Image Ontology and an Annotated Image Corpus as Intermedia for Cross-Language Image Retrieval," In CLEF 2006 Working Notes, 2006.
Duygulu et al., "Object Recognition as Machine Translation: Learning a Lexicon for a Fixed Image Vocabulary," in ECCV, 2002.
Zhai et al., "Model-based Feedback in the Language Modeling Approach to Information Retrieval," In CIKM, pp. 403-410, 2001.
Tao et al., "Regularized Estimation of Mixture Models for Robust Pseudo-Relevance Feedback," In SIGIR '06: Proceedings of the 29th annual international ACM SIGIR conference on Research and development in information retrieval, NY, US, 2006.
Pan et al., "GCap: Graph-based Automatic Image Captioning," in CVPR Workshop on Multimedia Data and Document Engineering, 2004.
Monay et al., "PLSA-based Image Auto-Annotation: Constraining the Latent Space," In ACM MM, 2004.
Lavrenko et al., "A Model for Learning the Semantics of Pictures," In NIPS, 2003.
Lavrenko et al., "Statistical Models for Automatic Video Annotation and Retrieval," In ICASSP, 2004.
Jeon et al., "Automatic Image annotation and Retrieval using Cross-Media Relevance Models," In ACM SIGIR, 2003.

* cited by examiner

CROSS-MEDIA SIMILARITY MEASURES THROUGH TRANS-MEDIA PSEUDO-RELEVANCE FEEDBACK AND DOCUMENT RERANKING

BACKGROUND

The following relates to the information processing arts, information retrieval arts, classification and clustering arts, and related arts.

Information retrieval systems provide a user-friendly interface by which a user can retrieve documents from a database that are relevant to or match a query. Typically, an information retrieval system ranks a "top N" documents that best match the query. An example of such a system is an Internet search engine.

Many information retrieval systems are text-based. That is, the information retrieval system receives a textual query and searches textual content of documents for similarities with the textual query, such as the same or similar words or terms, common semantic content (based, for example, on derivation of semantically related words determined using an on-line thesaurus), or so forth. In a more complex approach, language models may be developed to represent the query and documents to be searched, and the information retrieval is based on similarity of query and document language models.

Advantageously, textual content is commonplace, and can be efficiently stored and searched. However, digital information repositories enable storage and processing of information in many different media types or modalities, such as text, images, audio, video, or so forth. It is not unusual for a single document to include content of two or more different media types or modalities. Many, and perhaps most, Internet websites today include both text and images. Numerous Internet sites further include audio content, video content, and/or further media modalities.

In view of this, there is interest in information retrieval systems that are capable of retrieving documents based on non-textual content. Toward this end, it is known to represent image content in the form of image "features" that are believed to have semantic significance, that is, to be discriminative of the subject matter depicted in the image. For example, a feature indicating the fractional image content that is blue or green or bluish or greenish may be useful for detecting seascapes. A feature indicating a characteristic mammalian shape may be useful in detecting images of animals. Facial recognition features are also known that are indicative of human facial images, and so forth. Features can also be defined for other modalities. For example, a feature indicative of audio pitch may be useful for discriminating between male and female voice audio. The features based paradigm is also applicable to text, by defining textual features such as counts of semantically rich terms and so forth. Depending upon the available text layout information, textual features may also include layout information such as font type, column layout, or so forth. (For example, if a particular medical journal is published in a distinctive font, then the font type feature may be highly discriminative for identifying articles from that medical journal).

In sum, it is known that for a given media type or modality one can identify semantically discriminative features. One can therefore generate information retrieval systems for the various types of media, for example for text content, image content, video content, audio content, or so forth. For example, an image-based information retrieval system may operate by comparing features of a query image with features of images in an image repository.

Extending information retrieval to cross-media operation is more difficult. For example, given an image, one may wish to retrieve documents with textual content semantically related to the subject matter of the image. However, there is a "semantic gap" in that semantically relevant image features typically have no discernable analog in textual features, and vice versa.

For multimedia, some common approaches employ pseudo-relevance feedback. To illustrate using a query image as an example, one may perform a first information retrieval operation limited to image content on a multimedia reference repository to identify multimedia documents including images that are similar to the query image. The results of this first information retrieval operation are used to enrich the query with textual content. For example, if the image is a seascape, the first information retrieval operation is likely to return many multimedia documents relating to the sea, nautical themes, or the like. In these returned multimedia documents one may expect to identify nautically related terms such as "ocean", "water", "boat", or so forth, and these derived terms may be used to enrich the original image query with textual query content. This textual query content may in turn be used in a second information retrieval operation limited to textual content to retrieve additional multimedia documents related to the textual query including "ocean", "water", "boat", or so forth. The results of the first and second query operations then may be fused or combined to produce final query results, some of which may be cross-media in character (that is, some documents may have little or no image content that is similar to the query image, but may have instead been retrieved due to nautically related textual content alone).

Brief Description

In some illustrative embodiments disclosed as illustrative examples herein, a multimedia information retrieval method performed by an electronic device is disclosed, the method comprising: performing an initial information retrieval process respective to a multimedia reference repository to return a set of initial repository documents; computing values of at least one monomodal pairwise similarity measure for candidate documents of the multimedia reference repository respective to repository documents of the set of initial repository documents; and identifying a set of top ranked documents of the multimedia reference repository based at least in part on the values computed for the candidate documents.

In some illustrative embodiments disclosed as illustrative examples herein, a multimedia information retrieval method performed by an electronic device is disclosed, the method comprising: performing an initial monomodal information retrieval process operating on a first media modality to retrieve a set of initial repository documents from the multimedia reference repository; and identifying a set of top ranked documents of the multimedia reference repository based at least in part on pairwise similarity measure values respective to a second media modality different from the first media modality for document pairs that include documents of the set of initial repository documents.

In some illustrative embodiments disclosed as illustrative examples herein, a multimedia information retrieval system is disclosed, comprising a storage and an electronic processing device configured to perform a process including: performing an initial monomodal information retrieval process respective to a multimedia reference repository to return a set of initial repository documents, the monomodal information retrieval process operating on one member of the group consisting of text content and image content; and identifying a set of top ranked documents of the multimedia reference repository based at least on pairwise similarity measure values indicative of similarity with documents of the set of initial repository documents, the pairwise similarity measure values being indicative of similarity respective to the other member of the group consisting of text content and image content.

DETAILED DESCRIPTION

Figure 1:
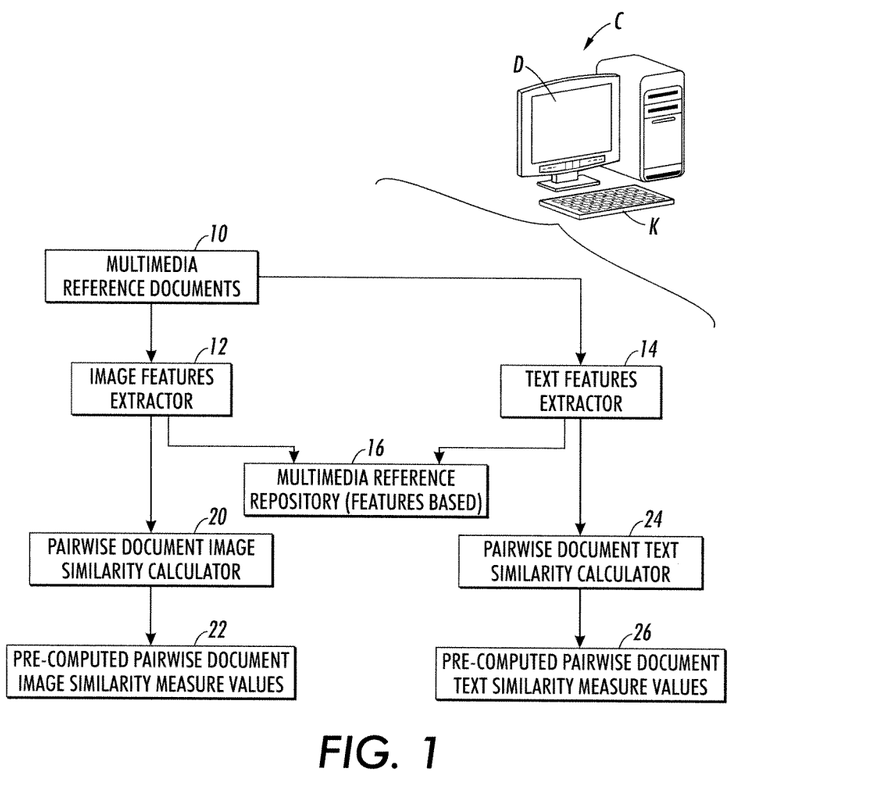
FIG. 1 diagrammatically shows a preparatory system configured to prepare a multimedia reference repository including pre-computed pairwise image similarity measures and text similarity measures.

The disclosed multimedia information retrieval techniques make use of a set of multimedia documents 10 that are processed to define a multimedia reference repository. In the following, the multimedia documents are assumed to include two media modalities, namely image content and text content. However, the techniques disclosed herein are readily extended to documents including other media modalities, such as audio content, video content, or so forth. The term "document" as used herein is to be broadly construed as encompassing any logically defined content collection, without regard to its arrangement of physical storage. For example, a multimedia document having both image and text content may be physically stored as an HTML file providing text content and one or more separate image files containing images suitably linked to the HTML document, for example using <img src> tags. As another example, a multimedia document may be stored as a single file containing both text and embedded images. It is contemplated for components of the multimedia document to be stored on different physical media, and/or at different physical locations. For example, a multimedia document may include an HTML file stored locally that links with an image stored at a remote server accessed via the Internet—in such a case, the multimedia document is suitably considered to include both the locally stored HTML file and the remotely located image. Audio content can be stored as embedded audio content or as linked files, for example linked *.wav, *.mp3, or *.ogg files. Video content can be stored as embedded video content or as linked files, for example linked *.mov, *.mpg, *.rm, or *.mp4 files. Other media modalities are also contemplated, such as graphical animation content, computer-aided design (CAD) content, or so forth. Different media modalities can also be variously integrated, for example as integrated audio/video content. In the illustrative embodiments set forth herein, the media modalities are assumed to include text and image content.

With continuing reference to FIG. 1, an image extractor 12 and a text extractor 14 are invoked to extract image features and text features, respectively, of the multimedia documents 10. The extracted features are preferably selected to be discriminative of semantic content.

In an illustrative embodiment, the image features extractor 12 extracts Fisher vectors representative of images. The image similarity is defined from a continuous vectorial representation of the image, obtained as follows. Image patches are first extracted on regular grids at five different scales with a ratio of $\sqrt{2}$ between two consecutive scales. Two types of low-level features are used: grey-level SIFTlike features (see, e.g. Lowe, "Distinctive image features from scale-invariant keypoints" IJCV vol. 60(2) (2004)) and color features. In both cases the image patch is subdivided in 4×4=16 subregions. SIFT-like features are then computed as gradient orientation histograms (for example, using 8 bins) collected on each subregion leading to a vector of 128 dimensions. Color features are statistical means and standard deviations of the three color channels (e.g., RGB channels) in the same subregions, which leads to a 96 dimensional feature vector. The dimensionality of both type of features are optionally reduced, for example down to 50 features, using principal component analysis (PCA). In some embodiments, the feature vectors are further processed. For example, a Gaussian Mixture Model (GMM) clustering technique (see, e.g., Farquhar et al., "Improving 'bag-of-keypoints' image categorization", Technical report, University of Southampton (2005); Perronnin et al., "Adapted vocabularies for generic visual categorization", in ECCV (2006)) is optionally performed to build a visual vocabulary (see, e.g. Sivic et al., "Video google: A text retrieval approach to object matching in videos" in ICCV vol. 2 (2003); Csurka et al., "Visual categorization with bags of keypoints", in ECCV Workshop on Statistical Learning for Computer Vision, (2004)) of low-level image features where each Gaussian component models a visual word. Each such Gaussian component is suitably characterized by $\lambda_i=\{\omega_i, \mu_i, \sigma_i\}$, i=1, ..., N where $\omega_i$, $\mu_i$, and $\sigma_i$ denote respectively the weight, mean vector, and covariance matrix of the Gaussian mixture model component indexed by i. In one suitable approach, two visual vocabularies are built: one based on texture, the other based on color. Both vocabularies have a dictionary size of 64 (meaning that the Gaussian mixture model includes 64 Gaussian components for each). Each image is then suitably represented with a Fisher Kernel-based normalized gradient vector (see, e.g. Perronnin et al., "Fisher kernels on visual vocabularies for image categorization", in CVPR (2007)). Thus, given a generative model (here the Gaussian Mixture Model) with parameters $\lambda_i$, i=1, ..., N, one can compute the gradient vector of each sample image I as $\nabla_\lambda \log p(I|\lambda)$. Intuitively, the gradient of the log-likelihood describes the direction in which parameters should be modified to best fit the data. It transforms a variable length sample I into a fixed length vector whose size is only dependent on the number of parameters in the model. Before computing a similarity measure between images, each vector is first normalized using the Fisher Information matrix $F_\lambda$ (see, e.g., Jaakkola et al., "Exploiting generative models in discriminative classifiers", in Advances in Neural Information Processing Systems 11 (1999)):

$$F_\lambda = E_X[\nabla_\lambda \log p(X|\lambda) \nabla_\lambda \log p(X|\lambda)'] \quad (1).$$

The normalized gradient vector, called the Fisher vector, is suitably given by:

$$f = F_\lambda^{-1/2} \nabla_\lambda \log p(X|\lambda) \quad (2).$$

A closed form for $F_\lambda^{-1/2}$ is given in Perronnin et al., "Fisher kernels on visual vocabularies for image categorization", in CVPR (2007). To generate a single features vector for an image, the Fisher vectors for color and texture respectively are then suitably concatenated.

Given the Fisher vector representation of two images I and J, a suitable monomodal similarity measure indicative of the similarity of image content in images I and J is given by:

$$sim_{Img}(I, J) = norm_{max} - \|f_I - f_J\| = norm_{max} - \sum_i |f_I^i - f_J^i|, \quad (3)$$

where $f^i$ are the elements of the Fisher vector f and $norm_{max}=2$.

In some instances herein, document parameters such as I or J or so forth may be multimedia documents. Equations (1)-(3) relating to monomodal image features extraction and monomodal image-based document comparisons are applicable to such multimedia documents, simply by applying Equations (1)-(3) only with respect to the image content of the multimedia documents.

In an illustrative embodiment, the text features extractor 14 extracts a features representation of text content as follows. The textual content is optionally preprocessed to produce a defined starting point. The preprocessing may include, for example: tokenization; lemmatization; word decompounding; stopword removal; or so forth. A bag-of-words representation of pre-processed texts is generated. The bag-of-words representation represents the document in terms of word counts or frequencies, typically without regard to word ordering. A language modeling approach is used to represent the textual features. Let p(w|q) denote the multinomial language model of a textual query q. The query language model p(w|q) may be obtained in various ways, such as by maximum likelihood estimates, simple counting and normalization, or so forth. In analogous fashion, let p(w|d) denote the multinomial language model of a document d. Optionally, the document language model may be smoothed, for example using a Jelinek-Mercer Method:

$$p(w|d) = \alpha p^{MLE}(w|d) + (1-\alpha) p(w|C) \quad (4),$$

where: p(w|C) is a corpus language model that models the total textual content of the multimedia reference documents 10 as a ratio of the number of occurrences of the term w in the corpus C respective to the corpus length in words; $p^{MLE}(w|d)$ is the unsmoothed document language model and is a ratio of the number of occurrences of the term w in the document d respective to the document length in words; and α controls the amount of smoothing. Other smoothing techniques are also suitable, such as Dirichlet Prior or Absolute Discounting. Although not explicitly written, the query language model p(w|q) is optionally also smoothed analogously to Equation (4).

In a typical comparison situation, the textual query q corresponds to the textual content of a query document (which may be a text-only document or a multimedia document), or said another way the query language model p(w|q) models the textual content of the query document. A similarity measure of the textual content of the query document and the textual content of another document d can be represented as a cross-entropy function:

$$sim_{txt}(q, d) = CE(q, d) = \sum_w p(w|q) \log(p(w|d)). \quad (5)$$

The cross-entropy textual similarity measure of Equation (5) is an asymmetric similarity measure. It can optionally be generalised to define the similarity between two documents $d_1$ and $d_2$ as follows:

$$sim_{txt}(d_1, d_2) = CE(d_1|d_2) = \sum_w p^{MLE}(w|d_1) \log(p(w|d_2)). \quad (6)$$

In some instances herein, document parameters such as $d_1$ or $d_2$ or so forth may be multimedia documents. Equations (4)-(6) relating to monomodal text features extraction and monomodal text-based document comparisons are applicable to such multimedia documents, simply by applying Equations (4)-(6) only with respect to the textual content of the multimedia documents.

The illustrative image and text feature representations and related similarity measures $sim_{Img}$ and $sim_{txt}$ set forth herein are illustrative examples. The techniques for multimedia information retrieval disclosed herein are built upon monomedia similarity measures such as the illustrative $sim_{Img}$ and $sim_{txt}$ similarity measures set forth herein as illustrative examples. More generally, the techniques for multimedia information retrieval disclosed herein can be built upon substantially any set of monomedia similarity measures appropriate for the types of media encountered in the multimedia repository. Moreover, other image and/or text similarity measures beyond the illustrative examples set forth herein, and more generally other image and/or text feature representations, can be employed.

With continuing reference to FIG. 1, the image feature representations extractor 12 extracts image feature representations for the image content of the multimedia reference documents 10, while the text feature representations extractor 14 extracts textual feature representations for the textual content of the multimedia reference documents 10. The resulting feature representations are used to generate a features-based multimedia reference repository 16 that stores the multimedia reference documents 10 along with corresponding image and text content feature representations. Thus, for example, a given multimedia document $d_i$ may be stored as the original document $d_i$ or a link thereto (for example, as an HTML file and any linked image files, or as a link to the HTML file) along with the image feature vector $f_i$ representing the image content of the multimedia document $d_i$ and a document language model multimedia document $p(w|d_i)$ representing the textual content of the multimedia document $d_i$.

It is generally desired to have a one-to-one correspondence between images and text in the multimedia repository 16. If a single multimedia document of the multimedia reference documents 10 includes text with multiple images, this can be treated in various ways. In one suitable approach, each image can be treated as a separate "document" including all associated text. For example, if a multimedia document includes ten images and associated text, then this document can be considered as ten documents, each including one of the images and all of the text. In another approach, each image in the multi-image multimedia document can be treated as a separate "document" including the image and text located within a defined proximity to the image, such as text on the same page as the image (for a paginated multimedia document) or text within a caption of the image (for a multimedia document with identifiable captions associated with images), or so forth. It is also contemplated to perform some "averaging" of the images in a multimedia document including multiple images, such as averaging or otherwise combining each vector component of the Fisher vectors of all the images of the multimedia document to generate a Fisher vector that is representative of the "average" image content of the multimedia document.

In the multimedia information retrieval techniques disclosed herein, use is made of pairwise similarity comparisons between documents of the multimedia reference repository 16. Optionally, a pairwise document image similarity calculator 20 pre-computes pairwise document image similarity measure values 22, that is the calculator 20 precomputes values for $sim_{Img}(d_i,d_j)$ for document pairs $d_i$, $d_j$ where $d_i$ and $d_j$ are documents in the multimedia reference repository 16. Since the multimedia reference repository 16 already includes the Fisher vectors $f_i$ and $f_j$ providing features-based representations of the image content of repository multimedia documents $d_i$ and $d_j$, respectively, computing $sim_{Img}(d_i,d_j)$ is further facilitated. Instead of precomputing the pairwise document image similarity measure values, these values can be computed as needed.

In similar fashion, a pairwise document text similarity calculator 24 optionally pre-computes pairwise document text similarity measure values 26, that is the calculator 20 optionally precomputes values for $sim_{txt}(d_i,d_j)$ for document pairs $d_i$, $d_j$ where $d_i$ and $d_j$ are documents in the multimedia reference repository 16. Since the multimedia reference repository 16 already includes the document language models $p(w|d_i)$ and $p(w|d_j)$ providing features-based representations of the textual content of repository multimedia documents $d_i$ and $d_j$, respectively, computing $sim_{txt}(d_i,d_j)$ is further facilitated. Again, in other embodiments the pairwise document text similarity measure values are not precomputed, but rather are computed as needed.

Figure 2:
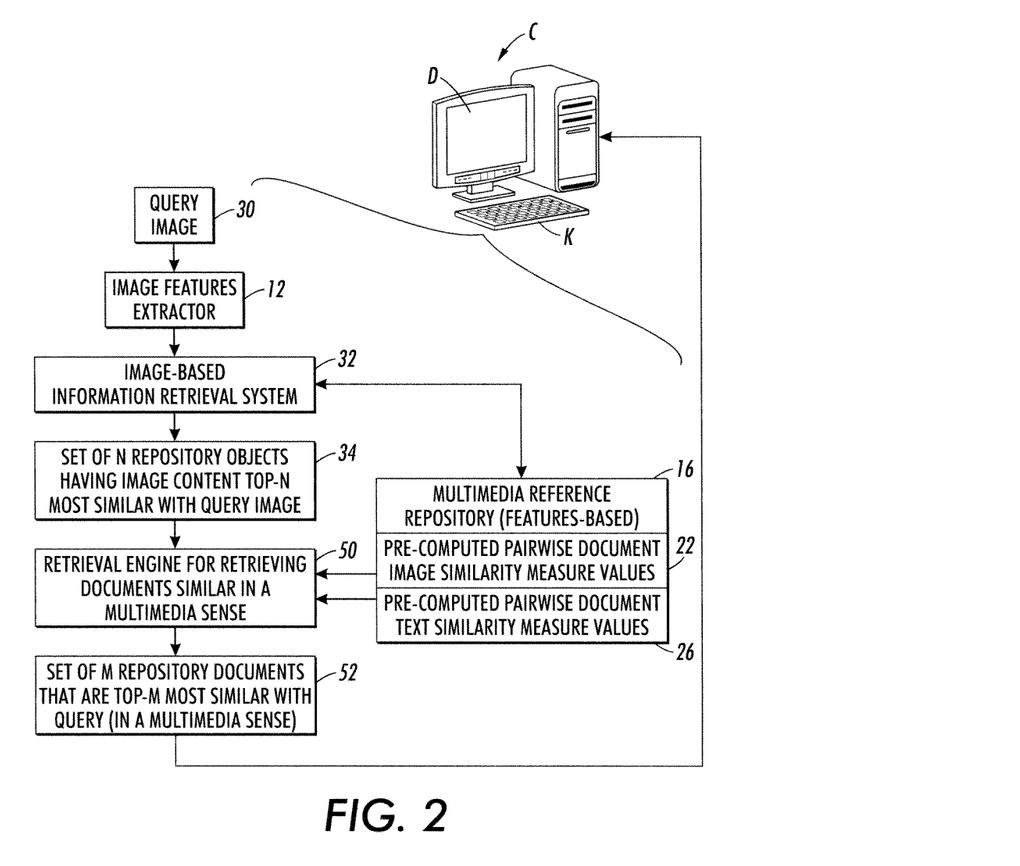
FIG. 2 diagrammatically shows a multimedia information retrieval system employing the multimedia reference repository generated by the preparatory system of FIG. 1 to process a query image.
Figure 3:
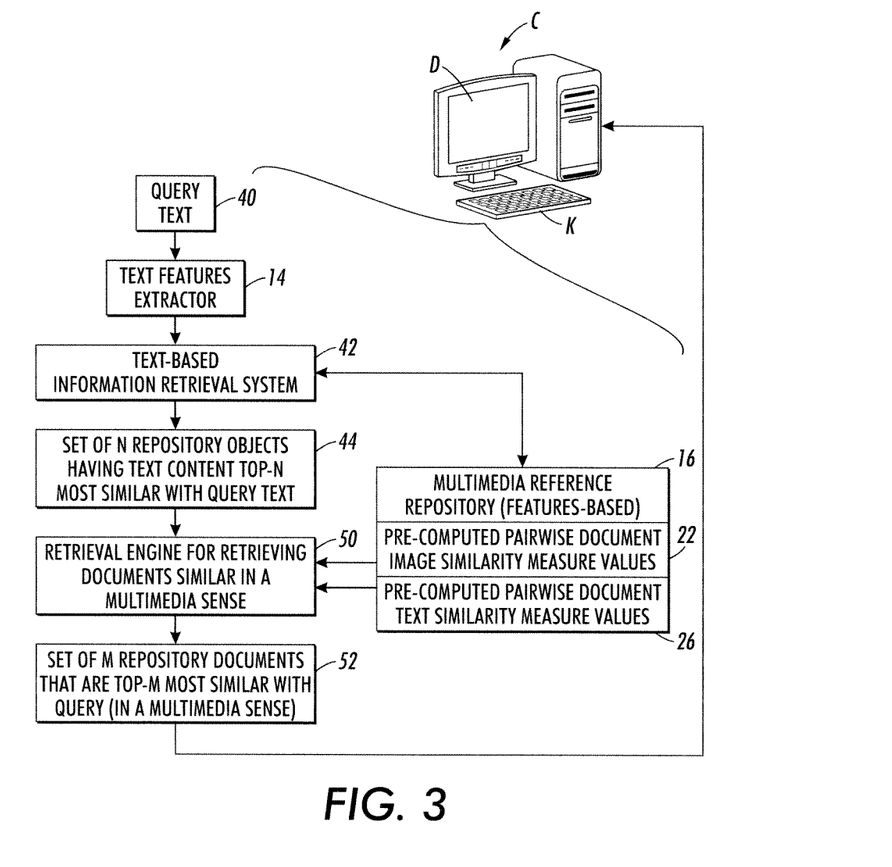
FIG. 3 diagrammatically shows the multimedia information retrieval system employing the multimedia reference repository generated by the preparatory system of FIG. 1 to process query text.

With reference to FIGS. 2 and 3, illustrative embodiments of a multimedia information retrieval system and related methods are described. In illustrative FIG. 2, the multimedia information retrieval system receives a query image 30 which is processed by the image features extractor 12 to generate a features-based representation of the query image 30. An image-based information retrieval system 32 interacts with the multimedia reference repository 16 to identify a set of N multimedia documents 34 having image content that is "top-N" most similar with the query image 30. In other words, looking solely at the image content and ignoring text content, the set of N multimedia documents 34 retrieved by the image-based information retrieval system 32 are those N documents whose image content (as indicated by their respective Fisher vectors $f_i$ in the illustrative embodiment) is closest to the image content of the query image 30 (again, as indicated by the Fisher vector representing the query image content in the illustrative embodiment). The image-based information retrieval system 32 is a monomodal system that processes only image content.

Advantageously, substantially any monomodal image-based information retrieval technique can be implemented by the system 32. As an illustrative example, the image-based information retrieval system 32 can rank the documents $d_i$ of the repository 16 respective to similarity with the query image 30 using the same image similarity measure $sim_{Img}(I,J)$ set forth in Equation (3) that is used to compute the pairwise image similarity measure values 22, using as inputs I and J the image features representations of the query image 30 and each repository document $d_i$ under consideration. However, in other embodiments the image-based information retrieval system 32 can use a retrieval algorithm that does not incorporate the pairwise similarity measure used to generate the values 22. Said another way, in general the image-based retrieval algorithm employed by the image-based information retrieval system 32 can be related to, or wholly different and independent from, the algorithm used by the pairwise document image similarity calculator 20 shown in FIG. 1.

The image-based information retrieval system 32 considers solely the image content; however, the set of N retrieved documents 34 are multimedia documents that include both image content (represented in the illustrative example by Fisher vectors) and text content (represented in the illustrative example by language models).

In an analogous example, in illustrative FIG. 3 the multimedia information retrieval system receives query text 40 which is processed by the text features extractor 14 to generate a features-based representation of the query text 40. A text-based information retrieval system 42 interacts with the multimedia reference repository 16 to identify a set of N multimedia documents 44 having textual content that is "top-N" most similar with the query text 40. In other words, looking solely at the text content and ignoring image content, the set of N multimedia documents 44 retrieved by the text-based information retrieval system 42 are those N documents whose text content (as indicated by their respective language models $p(w|d_i)$ in the illustrative embodiment) is closest to the text content of the query image 40 (again, as indicated by the query language model $p(w|q)$ representing the query text content in the illustrative embodiment). The text-based information retrieval system 42 is a monomodal system that processes only textual content.

Advantageously, substantially any monomodal text-based information retrieval technique can be implemented by the system 42. As an illustrative example, the text-based information retrieval system 42 can rank the documents $d_i$ of the repository 16 respective to similarity with the text image 40 using the same textual similarity measure $sim_{txt}(d_i,d_j)$ set forth in Equation (6) that is used to compute the pairwise text similarity measure values 26, using as inputs the text features representations of the query text 40 and each repository document $d_i$ under consideration. However, in other embodiments the text-based information retrieval system 42 can use a retrieval algorithm that does not incorporate the pairwise similarity measure used to generate the values 26. Said another way, in general the text-based retrieval algorithm employed by the text-based information retrieval system 42 can be related to, or wholly different and independent from, the algorithm used by the pairwise document text similarity calculator 24 shown in FIG. 1.

The text-based information retrieval system 42 considers solely the textual content; however, the set of N retrieved documents 44 are multimedia documents that include both image content represented by Fisher vectors and text content represented by language models.

The illustrative examples of FIGS. 2 and 3 show that the multimedia information retrieval system can receive query image 30 and identify N most similar repository documents 34 considering only the image content; or, the multimedia information retrieval system can receive text query 40 and identify N most similar repository documents 44 considering only the text content. Both of these retrieval operations are monomodal in nature, and therefore cannot identify or retrieve repository documents that are similar to the query in a cross-modal sense. For example, consider FIG. 2 where the query image 30 is a seascape. The retrieved N most similar documents 34 are likely to include multimedia documents with images of sailboats, waders, or other nautically-themed images. However, the retrieved N most similar documents 34 will not include a multimedia document that has no nautically related images but does include extensive text relating to the art of sailing.

To enable cross-modal information retrieval, the information retrieval system includes further components that employ some principles of pseudo-feedback, but operating in a cross-media sense to identify documents most similar to the top-N documents retrieved by the monomodal image search 32 or by the monomodal text search 42. As already noted, regardless of whether the monomodal search was image-based (i.e., using the image-based monomodal information retrieval system 32) or text-based (i.e., using the text-based monomodal information retrieval system 42), the output 34, 44 is in both cases multimedia documents including both image and text content.

Typically, a multimedia document has related images and text both of which relate to the same general subject matter. For example, a multimedia document including nautically related image will also include nautically related text, and vice versa. Accordingly, the documents 34 that were retrieved based on a monomodal image-only search can be expected to include substantial textual content related to the subject matter of the query image 30. Analogously, the documents 44 that were retrieved based on a monomodal text-only search can be expected to include substantial image content related to the subject matter of the textual image 40.

To enable retrieval of images using the text query 40, the documents 44 that were retrieved based on a monomodal text-only search are used as inputs for a multimedia search that takes into account both text and images to retrieve multimedia content including images that are similar in semantic content to the text query 40. To obtain more image-centric results, the documents 44 retrieved by the monomodal text-only search can be used in an image-only search, to generate images that are similar to the text query 40.

Conversely, to enable retrieval of text using the image query 30, the documents 34 that were retrieved based on a monomodal image-only search are used as inputs for a multimedia search that takes into account both text and images to retrieve multimedia content including text similar in semantic content to the image query 30. To obtain more text-centric results, the documents 34 retrieved by the monomodal image-only search can be used in a text-only search, to generate text similar to the image query 30.

With continuing reference to either FIG. 2 or FIG. 3, the initial set of documents 34 (or documents 44) retrieved by the monomodal retrieval operation are input to a retrieval engine 50 that retrieves a "top M" documents 52 that are most similar with the query 30 (or the query 40) in a multimedia sense. The symbol "M" denotes an integer greater than zero. M=1 is contemplated (the set of "top-M" documents may comprise a single top-ranked document), as well as M>1. In some embodiments, N=M, while in other embodiments N≠M.

A suitable operation of the multimedia retrieval engine 50 employs cross-media similarity measures that are based on the pre-computed values of the pairwise similarity measures 22, 26. Alternatively, the cross-media similarity measures may be computed in "real time" as needed by the retrieval engine 50, without performing precomputation. (This amounts to replacing the precomputed pairwise similarity measure values 22, 26 with the corresponding calculators 20, 24 in FIGS. 2 and 3). A candidate repository document under consideration by the retrieval engine 50 as a possible member of the set of top-M most similar documents 52 in the multimedia sense is represented as $d_j$. The set of N repository documents 34 (or the set of N repository documents 44) returned by the initial monomodal retrieval is represented as $\{d_i\}_{i=1,\ldots,N}$. It should be noted that these are not mutually exclusive—a candidate document $d_j$ may also be a member of the set of initially retrieved documents $\{d_i\}_{i=1,\ldots,N}$. (Indeed, it is expected that the top-M most similar documents 52 in the multimedia sense will likely include at least some of the initially retrieved documents $\{d_i\}_{i=1,\ldots,N}$).

A textual similarity measure between the repository document $d_j$ and the set of initially retrieved documents $\{d_i\}_{i=1,\ldots,N}$ is suitably computed by aggregating the textual similarity measures between the repository document $d_j$ and each document $d_i$ of the set of initially retrieved documents $\{d_i\}_{i=1,\ldots,N}$, that is:

$$sim_{txtgrp,j}(\{d_i\}_{i=1,\ldots,N}, d_j) = \sum_{i=1}^{N} sim_{txt}(d_i, d_j), \quad (7)$$

where the similarity measure values $sim_{txt}(d_i,d_j)$ are suitably defined in Equation (6) and are stored as the pre-computed pairwise text similarity values 26. In analogous fashion, an image-based similarity measure between the repository document $d_j$ and the set of initially retrieved documents $\{d_i\}_{i=1,\ldots,N}$ is suitably computed by aggregating the image similarity measures between the repository document $d_j$ and each document $d_i$ of the set of initially retrieved documents $\{d_i\}_{i=1,\ldots,N}$, that is:

$$sim_{imggrp,j}(\{d_i\}_{i=1,\ldots,N}, d_j) = \sum_{i=1}^{N} sim_{Img}(d_i, d_j), \quad (8)$$

where the similarity measure values $sim_{Img}(d_i,d_j)$ are suitably defined in Equation (3) and are stored as the pre-computed pairwise image similarity values 22.

The aggregate similarity measures of Equations (7) and (8) can be used in various ways by the retrieval engine 50. For example, if it is desired to retrieve text similar to the query image 30 of FIG. 2, then the textual similarity measure of Equation (7) is suitably used by itself. Conversely, if it is desired to retrieve images that are similar to the query text 40 of FIG. 3, then the image similarity measure of Equation (8) is suitably used by itself. In either case, the retrieval engine 50 suitably ranks all documents $d_j \in$ the repository 16 and selects the top-M highest ranked documents as the multimedia information retrieval results 52 for the image query 30 or for the text query 40.

In either FIG. 2 or FIG. 3, a multimedia similarity measure is optionally constructed as a weighted combination of Equations (7) and (8):

$$sim_{grp,j}(\{d_i\}_{i=1,\ldots,N}, d_j) = \qquad (9)$$
$$\lambda_{img} \sum_{i=1}^{N} [sim_{Img}(d_i, d_j)] + \lambda_{txt} \sum_{i=1}^{N} [sim_{txt}(d_i, d_j)],$$

where $\lambda_{img}$ and $\lambda_{txt}$ are weights for the image and text contributions, respectively, to the multimedia similarity measure of Equation (9). If different scoring schemes are used for the text and image similarity measures, respectively, then the weights $\lambda_{img}$ and $\lambda_{txt}$ optionally also provide renormalization to make the text and image similarity measures comparable.

In another approach, the original query is incorporated into the multimedia reranking performed by the multimedia retrieval engine 50. A suitable formulation in the case of the image query 30 is:

$$sim_{q,j}(q_{img}, \{d_i\}_{i=1,\ldots,N}, d_j) = \lambda_{img,q} sim_{img}(q_{img}, d_j) + \qquad (10)$$

$$\lambda_{img,grp} \sum_{i=1}^{N} [sim_{Img}(d_i, d_j)] + \lambda_{txt} \sum_{i=1}^{N} [sim_{txt}(d_i, d_j)],$$

where $q_{img}$ denotes the image query 30 and the additional term $\lambda_{img,q} sim_{img}(q_{img}, d_j)$ is a direct image content similarity measure between the query image 30 (represented as a Fisher vector in the illustrated embodiments) and the image content of the repository document $d_j$ under consideration. The weighting parameter $\lambda_{img}$ is broken into two parameters $\lambda_{img,q}$ and $\lambda_{img,grp}$ to enable relative weighting between the direct image similarity measure and the image similarity measure generated respective to the set of initially retrieved documents $\{d_i\}_{i=1,\ldots,N}$. In some embodiments, $\lambda_{img,grp}=0$ is contemplated for use in Equation (10). The case for the text query 40 is similar:

$$sim_{q,j}(q_{txt}, \{d_i\}_{i=1,\ldots,N}, d_j) = \lambda_{txt,q} sim_{txt}(q_{txt}, d_j) + \qquad (11)$$

$$\lambda_{img} \sum_{i=1}^{N} [sim_{Img}(d_i, d_j)] + \lambda_{txt,grp} \sum_{i=1}^{N} [sim_{txt}(d_i, d_j)],$$

where $q_{txt}$ denotes the text query 40 and the additional term $\lambda_{txt,q} sim_{txt}(q_{txt}, d_j)$ is a direct text content similarity measure between the text query 40 (represented as a query language model in the illustrated embodiments) and the textual content of the repository document $d_j$ under consideration. Here, the weighting parameter $\lambda_{txt}$ is broken into two parameters $\lambda_{txt,q}$ and $\lambda_{txt,grp}$ to enable relative weighting between the direct text similarity measure and the text similarity measure generated respective to the set of initially retrieved documents $\{d_i\}_{i=1,\ldots,N}$. In some embodiments, $\lambda_{txt,grp}=0$ is contemplated for use in Equation (11).

In the illustrated examples, the initial retrieval operation is monomodal—either a pure image retrieval 32 or a pure text retrieval 42. However, it is contemplated to extend the disclosed approach to a multimedia query and initial retrieval, in which the query and initial retrieval process entail both text and image content. This can be implemented, for example, by performing separate monomodal image retrieval and monomodal text retrieval operations as described with reference to respective FIGS. 2 and 3, and then fusing the two sets of N results to generate the set of initially retrieved documents $\{d_i\}_{i=1,\ldots,2N}$ where the number of documents is 2N because of the combination of results from the separate monomodal image and text retrieval operations. The retrieval engine 50 can then operate on the set of initially retrieved documents $\{d_i\}_{i=1,\ldots,2N}$ as described using Equation (9). Alternatively, if the cross-media information provided by the set of initially retrieved documents $\{d_i\}_{i=1,\ldots,2N}$ is to be augmented by the original query content, as in Equations (10)-(11), then these equations can be combined as:

$$sim_{q,j}(q_{img}, q_{txt}, \{d_i\}_{i=1,\ldots,N}, d_j) = \qquad (12)$$

$$\lambda_{img,q} sim_{img}(q_{img}, d_j) + \lambda_{txt,q} sim_{img}(q_{txt}, d_j) +$$

$$\lambda_{img,grp} \sum_{i=1}^{N} [sim_{Img}(d_i, d_j)] + \lambda_{txt,grp} \sum_{i=1}^{N} [sim_{txt}(d_i, d_j)],$$

where the parameters $q_{img}$ and $q_{txt}$ here denote the image and text content components of a multimedia query.

The various weighting parameters $\lambda$ can be selected in various ways. In a simple approach for the multimedia similarity measure of Equation (9), for example, $\lambda_{img}=\lambda_{txt}=0.5$ provides equal weights to the image and text components. In the multimedia similarity measures of Equations (10) and (11), it may be advantageous to select the weights to emphasize the monomodal query component $\lambda_{img,q} sim_{img}(q_{img}, d_j)$ or $\lambda_{txt,q} sim_{txt}(q_{txt}, d_j)$ that directly relate to the query. In some embodiments, the weights are obtained by training or optimization of the $\lambda$ values respective to a labeled or annotated training set. In all cases, the weighting parameters $\lambda$ optionally also account for different similarity measure schemes to provide renormalization so as to make the various similarity measures comparable.

The optional pre-computation and storage of pairwise monomodal similarity measure values $sim_{Img}(\ldots)$ 22 and $sim_{txt}(\ldots)$ 26 for all pairs of documents in the multimedia document repository 16 may enhance efficiency of the multimedia information retrieval techniques disclosed herein, since these values do not need to be computed at runtime when processing the query 30, 40. However, it is also contemplated to omit the pre-computation and to compute these pairwise monomodal similarity measure values at runtime, that is, after receipt of the query 30 or of the query 40.

The term "aggregate", "aggregation" or the like as used herein is intended to encompass any quantitative combination of the aggregated values, terms, quantities, or so forth. An aggregation may, for example, be a sum, a weighted sum (as in the case of Equations (9)-(12)), an average, a weighted average (for example, incorporating a 1/N normalization into the group weighting parameters), or so forth.

In the embodiments of FIGS. 2 and 3, the set of M retrieved repository documents 52 that are most similar to the query in the multimedia sense may be taken as a final output set of documents, and may be utilized in a suitable fashion. For example, the M retrieved repository documents 52 may be displayed on a display D of a computer C or otherwise output in a human-perceptible format. Instead of displaying the documents 52, an indication of the set of top-ranked documents 52 of the multimedia reference repository may be displayed, such indication suitably being, for example, a list of titles of the set of top-ranked documents 52 of the multimedia reference repository.

Alternatively, the M retrieved repository documents 52 may be used in other ways. For example, in a document generation setting, a user may employ the computer C in drafting a new multimedia document. The user may highlight and select text to define the text query 40, and the image content of the M retrieved repository documents 52 (or perhaps of the highest-ranked document of those M documents 52) is automatically inserted into the new multimedia document under drafting. Conversely, if the user inserts an image into the new multimedia document, the user may select the image as the query 30 to obtain relevant text for use as an image caption.

As another application example, the multimedia information retrieval system may be used as a component of a clustering or categorization system. In this application, pre-annotated categories of the M retrieved repository documents 52 are used to assign one or more categories to the input query (image 30, or text 40, or an image/text multimedia query). For example, in a hard classification assignment the query may be assigned the category most frequently occurring amongst the M retrieved repository documents 52. In a soft classification assignment the query may be assigned one or more categories whose occurrence amongst the M retrieved repository documents 52 exceeds a threshold. In these approaches, the documents of the multimedia document repository 16 must be pre-annotated with classifications. In another approach, the repository documents are not pre-annotated, but the features of the M retrieved repository documents 52 are used to enrich a feature representation of the query so as to provide more accurate or robust classification of the query.

The various illustrated system components can be variously arranged. For example, the various processing components 12, 14, 20, 24, 32, 42, 50 may be embodied as the computer C or another electronic processing device that is suitably programmed or otherwise configured to perform the specified operations and that includes or has access to suitable storage for implementing the storage elements 16, 22, 26. Suitable storage may include, for example: magnetic disk storage, optical disk storage, random access memory (RAM), FLASH memory, or so forth. The query 30, 40 may be received via various mechanisms, such as an illustrated keyboard K, a mouse, trackball, or other user input device, or the query may be received from an automated source such as a document authoring system. The various processing components 12, 14, 20, 24, 32, 42, 50 may also be embodied as a storage medium storing instructions executable to perform the processing. Suitable storage media include, for example: magnetic tape; a magnetic disk or disks; an optical disk; random access memory (RAM); read-only memory (ROM); FLASH or other electrostatic memory; or so forth.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A multimedia information retrieval method performed by an electronic device, the method comprising:
   pre-computing values of at least one monomodal pairwise similarity measure for document pairs of a multimedia reference repository and storing the pre-computed values of at least one monomodal pairwise similarity measure for the document pairs of the multimedia reference repository in a storage of or accessible by the electronic device;
   after storing the pre-computed values of at least one monomodal pairwise similarity measure for the document pairs of the multimedia reference repository, performing an initial information retrieval process respective to the multimedia reference repository to return a set of initial repository documents;
   selecting and retrieving from the storage pre-computed values of the at least one monomodal pairwise similarity measure for candidate documents of the multimedia reference repository respective to repository documents of the set of initial repository documents; and
   identifying a set of top-ranked documents of the multimedia reference repository based at least in part on the retrieved pre-computed values of the at least one monomodal pairwise similarity measure for the candidate documents of the multimedia reference repository respective to repository documents of the set of initial repository documents.

2. The multimedia information retrieval method as set forth in claim 1, wherein the performing of an initial information retrieval process comprises:
   performing a first monomodal information retrieval operation respective to the multimedia reference repository using a first monomodal query derived from a query document, the first monomodal query relating to a first media modality;
   wherein the set of initial repository documents comprises at least results of the first monomodal information retrieval operation.

3. The multimedia information retrieval method as set forth in claim 2, wherein the performing of an initial information retrieval process further comprises:
   performing a second monomodal information retrieval operation respective to the multimedia reference repository using a second monomodal query derived from the query document, the second monomodal query relating to a second media modality different from the first media modality;
   wherein the set of initial repository documents comprises an aggregation of results of the first monomodal information retrieval operation and the second monomodal information retrieval operation.

4. The multimedia information retrieval method as set forth in claim 2, further comprising:
   assigning a classification to the query document based on the set of top-ranked documents of the multimedia reference repository.

5. The multimedia information retrieval method as set forth in claim 1, wherein the identifying comprises ranking the candidate documents based at least in part on an aggregation for each candidate document of the retrieved pre-computed values of the at least one monomodal pairwise similarity measure for the candidate document respective to repository documents of the set of initial repository documents aggregated over the set of initial repository documents.

6. The multimedia information retrieval method as set forth in claim 5, wherein the identifying further comprises ranking the candidate documents based at least in part on an aggregation for each candidate document of the retrieved pre-computed values of at least two monomodal pairwise similarity measures relating to at least two different media modalities.

7. The multimedia information retrieval method as set forth in claim 6, wherein the at least two different media modalities include an image media modality and a text media modality.

8. The multimedia information retrieval method as set forth in claim 1, further comprising:
   displaying the set of top-ranked documents of the multimedia reference repository or an indication of the set of top-ranked documents of the multimedia reference repository on a display of or accessible by the electronic device.

9. The multimedia information retrieval method as set forth in claim 1, wherein:
   the performing an initial information retrieval process comprises performing a monomodal initial information retrieval process using a query comprising first media modality content, and
   the pre-computing values comprises pre-computing values of at least one monomodal second media modality pairwise similarity measure relating to a second media modality different from the first media modality.

10. The multimedia information retrieval method as set forth in claim 9, wherein the identifying comprises:
    identifying a set of top-ranked documents of the multimedia reference repository based on (i) similarity of first media modality content of the candidate documents respective to first media modality content of the query and (ii) the retrieved pre-computed values of the at least one monomodal pairwise similarity measure for the candidate documents respective to repository documents of the set of initial repository documents.

11. A multimedia information retrieval method performed by an electronic device, the method comprising:
pre-computing pairwise similarity measure values respective to different first and second media modalities for all pairs of documents in a multimedia reference repository and storing the pre-computed values in a storage of or accessible by the electronic device;
performing an initial monomodal information retrieval process operating on the first media modality using pre-computed pairwise similarity measure values respective to the first media modality retrieved from the storage to retrieve a set of initial repository documents from the multimedia reference repository; and
identifying a set of top-ranked documents of the multimedia reference repository based at least in part on pre-computed pairwise similarity measure values respective to the second media modality retrieved from the storage for document pairs that include documents of the set of initial repository documents.

12. The multimedia information retrieval method as set forth in claim 11, wherein the first media modality is text and the second media modality is images.

13. The multimedia information retrieval method as set forth in claim 11, wherein the first media modality is images and the second media modality is text.

14. The multimedia information retrieval method as set forth in claim 11, wherein the identifying is further based on pairwise similarity measure values respective to the first media modality for document pairs that include documents of the set of initial repository documents.

15. The multimedia information retrieval method as set forth in claim 11, wherein identifying is based solely on the pre-computed pairwise similarity measure values respective to the second media modality retrieved from the storage for document pairs that include documents of the set of initial repository documents.

16. A multimedia information retrieval system comprising:
a storage that stores:
(i) a multimedia reference repository of multimedia documents and corresponding image and text content feature representations,
(ii) precomputed pairwise document text similarity measure values indicative of text content similarity for all pairs of documents in the multimedia reference repository, and
(iii) precomputed pairwise document image similarity measure values indicative of image content similarity for all pairs of documents in the multimedia reference repository; and
an electronic processing device configured to perform a process including:
performing an initial monomodal information retrieval process respective to the multimedia reference repository to return a set of initial repository documents, the monomodal information retrieval process operating on one member of the group consisting of text content and image content, and
identifying a set of top-ranked documents of the multimedia reference repository based at least on precomputed pairwise similarity measure values indicative of similarity with documents of the set of initial repository documents, the precomputed pairwise similarity measure values being indicative of similarity respective to the other member of the group consisting of text content and image content, the identifying operation retrieving the precomputed pairwise similarity measure values from the storage.

17. The multimedia information retrieval system as set forth in claim 16, wherein the monomodal information retrieval process is a text-only information retrieval process and the pairwise similarity measure values are indicative of image content similarity.

18. The multimedia information retrieval system as set forth in claim 16, wherein the monomodal information retrieval process is an image-only information retrieval process and the pairwise similarity measure values are indicative of text content similarity.

* * * * *